(12) United States Patent
Takahashi et al.

(10) Patent No.: US 9,451,520 B2
(45) Date of Patent: Sep. 20, 2016

(54) MOBILE COMMUNICATION SYSTEM

(71) Applicant: NTT DOCOMO, INC., Tokyo (JP)

(72) Inventors: Hideaki Takahashi, Tokyo (JP); Kazuaki Takeda, Tokyo (JP); Takeshi Nakamori, Tokyo (JP); Hiroyuki Ishii, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/375,274

(22) PCT Filed: Jan. 30, 2013

(86) PCT No.: PCT/JP2013/052051
§ 371 (c)(1),
(2) Date: Jul. 29, 2014

(87) PCT Pub. No.: WO2013/115253
PCT Pub. Date: Aug. 8, 2013

(65) Prior Publication Data
US 2015/0011217 A1 Jan. 8, 2015

(30) Foreign Application Priority Data
Jan. 30, 2012 (JP) ................................. 2012-017378

(51) Int. Cl.
*H04W 36/30* (2009.01)
*H04W 36/16* (2009.01)
*H04L 5/00* (2006.01)
*H04W 36/00* (2009.01)
*H04W 16/32* (2009.01)

(52) U.S. Cl.
CPC .............. *H04W 36/30* (2013.01); *H04L 5/001* (2013.01); *H04W 36/0094* (2013.01); *H04W 36/165* (2013.01); *H04W 16/32* (2013.01)

(58) Field of Classification Search
CPC ............ H04W 24/10; H04W 84/045; H04W 36/0083; H04W 36/0061; H04W 36/0088; H04W 24/02; H04W 72/082; H04W 36/0094; H04W 52/244; H04W 76/048; H04W 36/28; H04W 36/0005; H04W 36/00
USPC ......... 455/436, 67.11, 422.1, 423, 437, 443; 370/252, 331, 329
See application file for complete search history.

(56) References Cited

U.S. PATENT DOCUMENTS

2013/0058244 A1* 3/2013 Huang ........................ 370/252

OTHER PUBLICATIONS

R2-115745 Inter-frequency Pico cell measurements for Hetnet deployments from NTT DOCOMO, INC at 3GPP TSG-RAN WG2 #76 Nov. 14-18, 2011 San Francisco, USA.*
3GPP TS 36.331 V10.4.0 (Dec. 2011) Radio Resource Control (RRC).*
International Search Report issued in PCT/JP2013/052051 mailed on Feb. 26, 2013 (3 pages).

(Continued)

*Primary Examiner* — Dung Hong
(74) *Attorney, Agent, or Firm* — Osha Liang LLP

(57) ABSTRACT

Appropriate performance is required for "Inter-Frequency Measurement" in accordance with the conditions of a cell to be subjected to "Inter-Frequency Measurement". A mobile communication system according to the present invention is configured to separately specify the performance required for "Inter-Frequency Measurement" to be used in "Inter-frequency Handover" control between macrocells #11 and #12 and the performance required for "Inter-frequency Handover" to the cell #11B which is not set as an Scell within the coverage area of the macrocell #11.

2 Claims, 4 Drawing Sheets

(56) References Cited

OTHER PUBLICATIONS

ZTE; "SCell Measurement Restriction"; 3GPP TSG-RAN WG2 Meeting #76, R2-115765; San Francisco, USA; Nov. 14-18, 2011 (4 pages).

Alcatel-Lucent; "Inter-frequency RRM and time domain ICIC enhancement"; 3GPP TSG-RAN WG2 Meeting #75bis, R2-115349; Zhuhai, China; Oct. 10-14, 2011 (4 pages).

Samsung; "Inter-frequency eICIC enhancement Issues"; 3GPP TSG-RAN2#75Bis meeting, R2-115425; Zhuhai, China; Oct. 10-14, 2011 (4 pages).

Huawei; "Small Cell Discovery in HetNet"; 3GPP TSG RAN WG2 Meeting #75bis, R2-115169; Zhuhai, China; Oct. 10-14, 2011 (4 pages).

NTT DOCOMO. INC.; "Inter-frequency Pico cell measurements for Hetnet deployments"; 3GPP TSG-RAN WG2 #76, R2-115745; San Francisco, USA; Nov. 14-18, 2011 (4 pages).

3GPP TS 36.133 V8.15.0; "3rd Generation Partnership Project; Technical Specification Group Radio Access Network; Evolved Universal Terrestrial Radio Access (E-UTRA); Requirements for support of radio resource management (Release 8)"; Sep. 2011 (339 pages).

3GPP TS 36.211 V10.6.0; "3rd Generation Partnership Project; Technical Specification Group Radio Access Network; Evolved Universal Terrestrial Radio Access (E-UTRA); Physical Channels and Modulation (Release 10)"; Dec. 2012 (101 pages).

3GPP TS 36.331 V11.1.0; "3rd Generation Partnership Project; Technical Specification Group Radio Access Network; Evolved Universal Terrestrial Radio Access (E-UTRA); Radio Resource Control (RRC); Protocol specification (Release 11)"; Sep. 2012 (325 pages).

* cited by examiner

MOBILE COMMUNICATION SYSTEM

TECHNICAL FIELD

The present invention relates to a mobile communication system.

BACKGROUND ART

In LTE (Long Term Evolution), it has been considered to dispose cells (e.g., cells #11A and #11B), which are each operated by a capacity band for improving the throughput in a hot spot, in a coverage area of a cell (e.g., a cell #11) operated by a coverage band supporting a wide area, as shown in FIG. 1.

In such an environment, as shown in FIG. 2, a mobile station UE in "RRC_Connected state" in the cell #11 operated in a frequency f1 is expected to perform "Inter-Frequency Measurement" in the cells #11A and #11B disposed in the coverage area of the cell #11, in order to determine whether or not the cells #11A and #11B can be added as Scells in CA (Carrier Aggregation).

PRIOR ART DOCUMENT

Non-Patent Document

Non-patent document 1: 3GPP contributed article R2-115745
Non-patent document 2: 3GPP Specification TS36.133

SUMMARY OF THE INVENTION

Since the coverage areas of the cells #11A and #11B are generally much smaller than that of the cell #11, there may be a case, depending on the location of the mobile station UE in the cell #11, where the mobile station UE does not set the cells #11A and #11B as Scells, or sets the cells #11A and #11B as Scells but does not activate them.

However, current LTE is provided without the assuming such cases, and only one kind of performance required for "Inter-Frequency Measurement" is specified.

Thus, in current LTE, the same performance is required for "Inter-Frequency Measurement" to be used for control of inter-frequency handover between macrocells in coverage bands and for "Inter-Frequency Measurement" for a cell not set as an Scell.

Here, the performance required for such "Measurement" include measurement accuracy, a measurement cycle, a cycle of measurement result report to an upper layer, the number of cells to be measured, the maximum number of measurement frequencies (only in the case of inter-frequency measurement), and the like.

In other words, the mobile station UE needs to perform "Inter-Frequency Measurement" for the cell not set as the Scell at an equal level to "Inter-Frequency Measurement" to be used for inter-frequency handover control between the macrocells in the coverage bands, which leads to a problem that the mobile station UE has to consume large power.

The present invention has been made in view of the above-mentioned problem. An objective of the present invention is to provide a mobile communication system capable of requiring appropriate performance of "Inter-Frequency Measurement" according to the conditions of a cell to be subjected to "Inter-Frequency Measurement".

A first feature of the present invention is summarized as a mobile communication system configured to be able to perform carrier aggregation using a primary cell and a secondary cell operated by different frequency carriers, in which the mobile communication system separately specifies performance required for inter-frequency measurement used for inter-frequency handover control between macrocells and performance required for measurement of a cell not set as the secondary cell within a coverage area of each of the macrocells.

A second feature of the present invention is summarized as a mobile communication system configured to be able to perform carrier aggregation using a primary cell and a secondary cell operated by different frequency carriers, in which the mobile communication system separately specifies first performance required for measurement of an activated secondary cell, second performance required for measurement of a secondary cell which is set but not activated, and third performance required for measurement of a cell which is not set as the secondary cell, and each of the first performance, the second performance and the third performance includes measurement accuracy and a measurement cycle.

MODE FOR CARRYING OUT THE INVENTION

Mobile Communication System According to First Embodiment of the Invention

Figure 1:
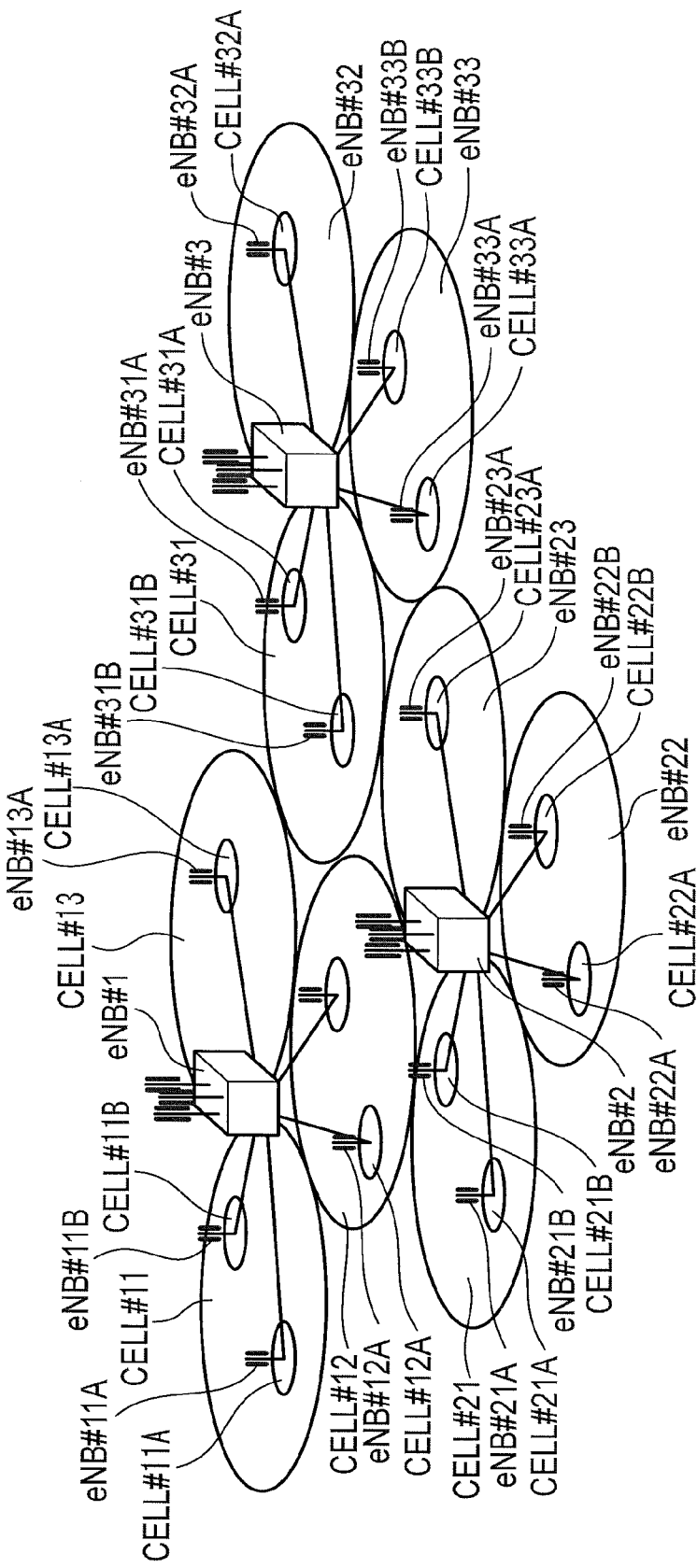
FIG. 1 is an overall configuration diagram of a mobile communication system according to a first embodiment of the present invention.
Figure 3:
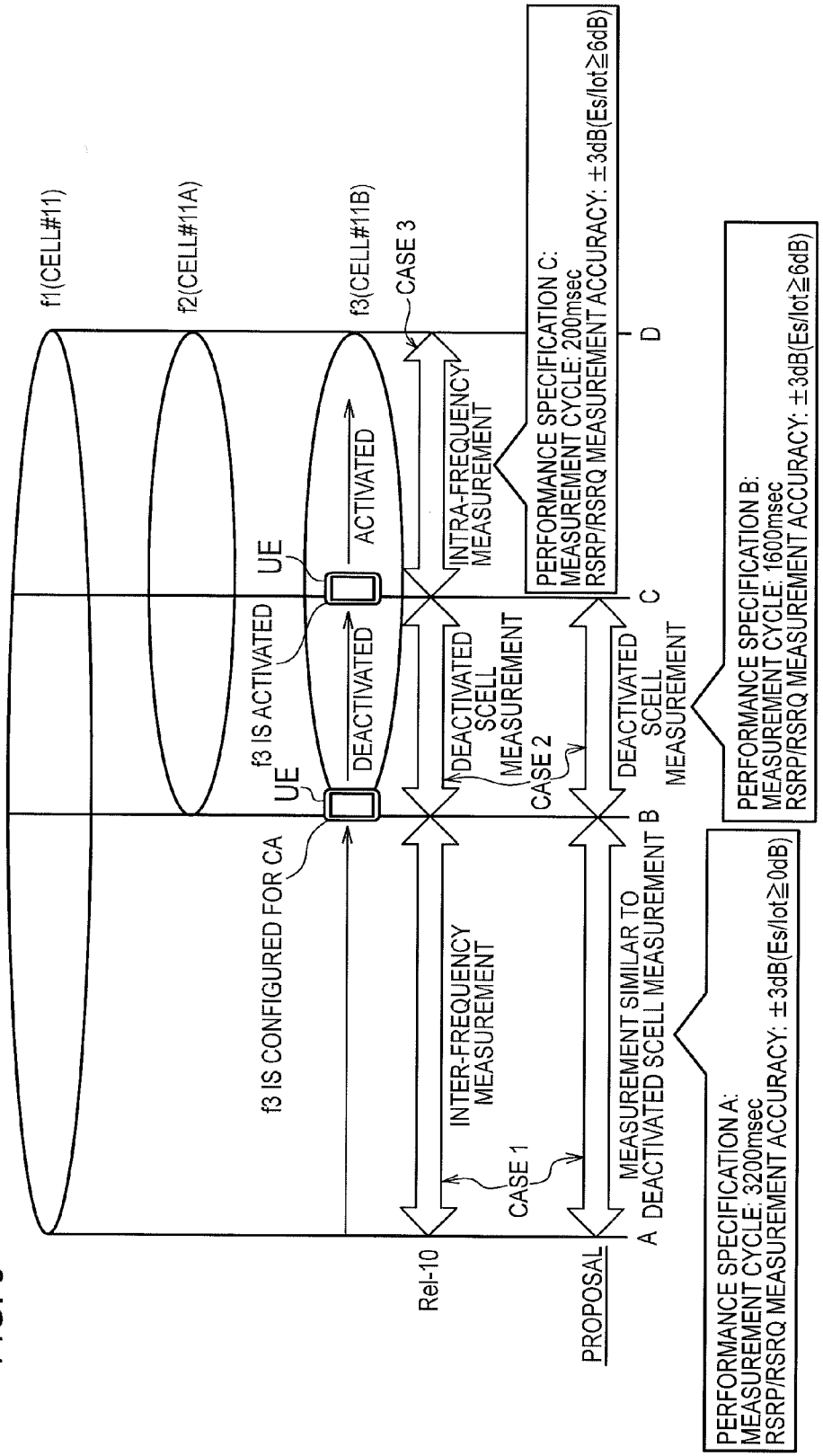
FIG. 3 is a diagram for explaining an example of performance required for "Measurement" in a mobile communication system according to Modified Example 1 of the present invention.
Figure 4:
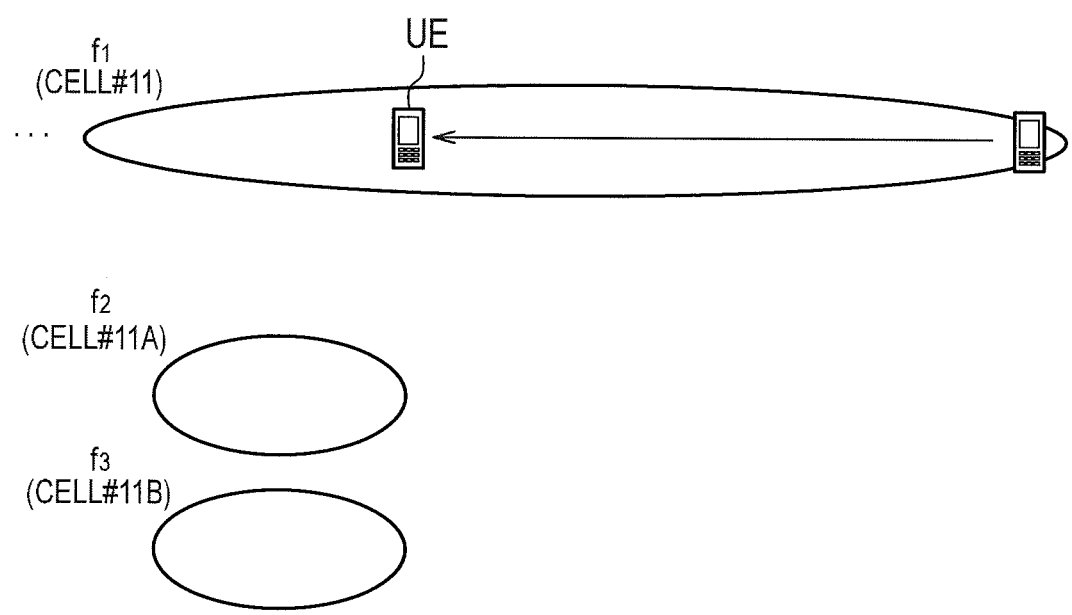
FIG. 4 is a diagram for explaining a measurement process performed by a mobile station in a conventional mobile communication system.

With reference to FIGS. 1 and 3, a mobile communication system according to a first embodiment of the present invention is described.

As shown in FIG. 1, the mobile communication system according to this embodiment supports LTE-Advanced, and is configured to be able to perform "CA" using a Pcell and an Scell operated by different frequency carriers.

Note that the mobile communication system according to this embodiment may be configured to be able to perform "Inter-band CA" using a Pcell and an Scell operated by carriers in different frequency bands, or may be configured to be able to perform "Inter-band CA" using a Pcell and an Scell operated by carriers in the same frequency band.

Note that the mobile communication system according to this embodiment may be configured to be able to perform "Inter-band CA" using a Pcell and Scells operated by carriers in the same frequency band.

As shown in FIG. 1, in the mobile communication system according to this embodiment, radio base stations eNB#1 to eNB#3 manages cells #11 to #33 and cells #11A to #33B.

Here, the cells #11 to #33 are cells (e.g., macrocells) operated by a coverage band supporting a wide area, for example, by a carrier of a frequency f1 (PCC: Primary Component Carrier).

On the other hand, the cells #11A to #33B are cells (e.g., picocells) disposed within coverage areas of the cells #11 to #33 and operated by capacity bands for improving the throughput in hot spots, for example, by carriers of frequencies f2 and f3 (SCC: Secondary Component Carrier).

Figure 2:
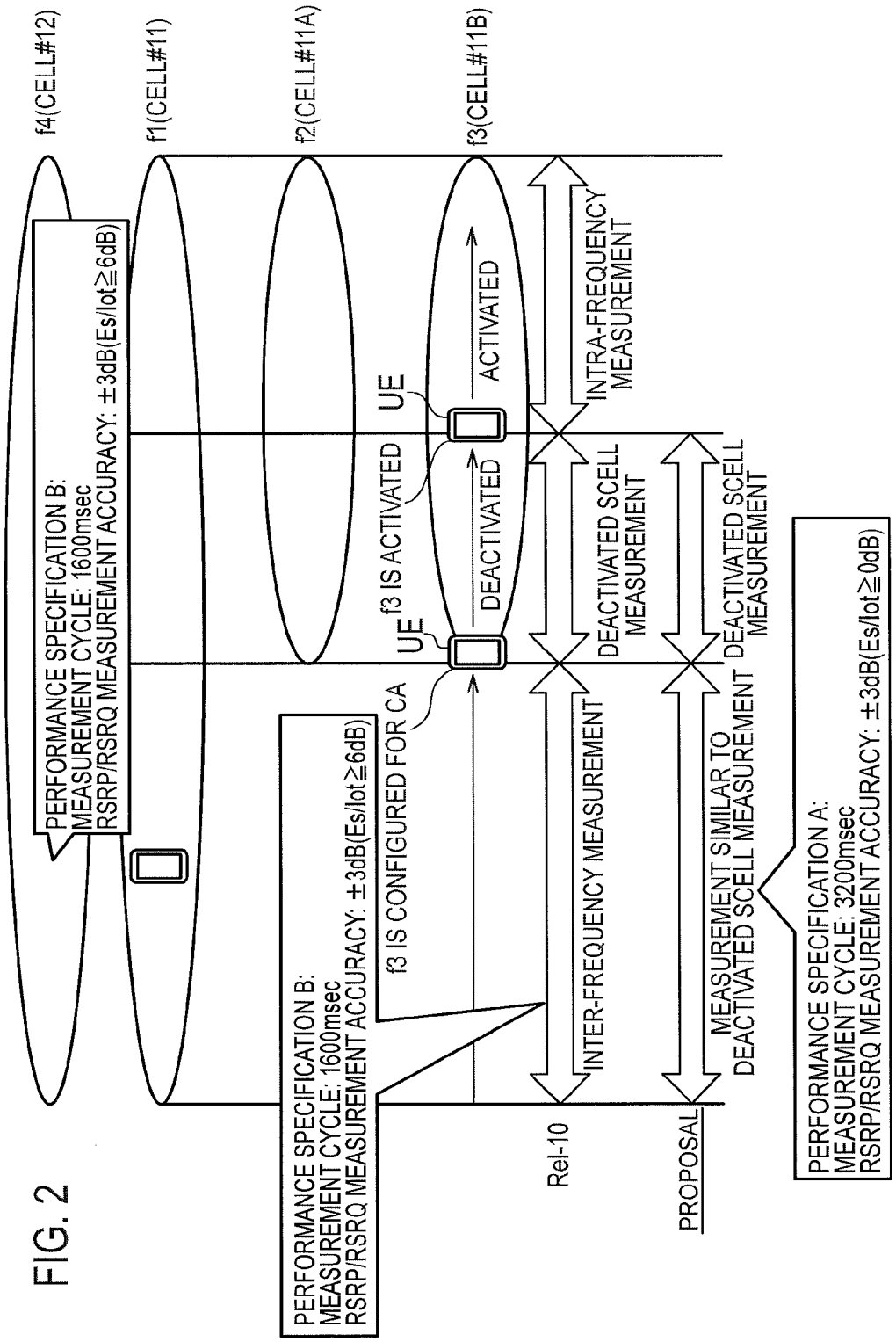
FIG. 2 is a diagram for explaining an example of performance required for "Measurement" in the mobile communication system according to the first embodiment of the present invention.

In the example of FIG. 2, the cell #11 operated by the carrier having the frequency f1 is set as the Pcell for the mobile station UE, while the cell #11A operated by the carrier having the frequency f2 is set as the Scell for the mobile station UE and activated.

Note that the cell #11B is operated by the carrier having the frequency f3 and the radio base station eNB determines, based on the location of the mobile station UE within the cell #11, whether or not to additionally set and activate the cell #11B as the Scell for the mobile station UE.

Also, in the example of FIG. 2, the mobile station UE is moved from Point A, to Point B, to Point C, and to Point D within the cell #11.

Furthermore, in the example of FIG. 2, the radio base station eNB does not additionally set the cell #11B as the Scell for the mobile station UE until the mobile station UE reaches Point B within the cell #11.

Thereafter, the radio base station eNB additionally sets the cell #11B as the Scell for the mobile station UE when the mobile station UE reaches Point B within the cell #11.

Then, the radio base station eNB activates the cell #11B as the Scell for the mobile station UE when the mobile station UE reaches Point C within the cell #11.

Also, the mobile station UE performs "Measurement" in the cells #11 and #12 as well as "Measurement" in the cells #11A and #11B disposed in the coverage area of the cell #11.

More specifically, the mobile station UE performs "Inter-Frequency Measurement" for the cell #11B which is not set as the Scell in the area from Point A to Point B within the cell #11 (Case 1).

Moreover, the mobile station UE performs "Intra-Frequency Measurement" for the cell #11B which is set as the Scell but not activated in the area from Point B to Point C within the cell #11 (Case 2).

Furthermore, the mobile station UE performs "Intra-Frequency Measurement" for the cell #11B activated as the Scell in the area from Point C to Point D within the cell #11 (Case 3).

Here, LTE (Release-10) is specified such that equal performance (Performance Specification B) is required for "Inter-Frequency Measurement" to be used for "Inter-Frequency Handover" control between the macrocells #11 and #12 in the coverage bands and for "Inter-Frequency Measurement (Case 1)" for a cell which is not set as a Scell.

Note that, in the present specification, the performance required for such "Measurement" includes measurement accuracy, a measurement cycle, a cycle of measurement result report to an upper layer, the number of cells to be measured, the maximum number of measurement frequencies (only in the case of inter-frequency measurement), and the like.

In contrast to this, the mobile communication system according to this embodiment is configured to separately specify the performance (Performance Specification A) required for "Inter-Frequency Measurement" to be used for "Inter-Frequency Handover" control between the macrocells #11 and #12 in the coverage bands and the performance (Performance Specification B) required for "Inter-Frequency Measurement (Case 1)" for a cell which is not set as a Scell.

For example, in the mobile communication system according to this embodiment, as shown in FIG. 2, Performance Specification A may specify the measurement cycle as "3200 ms" and the measurement accuracy of RSRP (Reference Signal Received Power)/RSRQ (Reference Signal Received Quality) as "±3 dB (Es/Iot≥0 db)".

Also, in the mobile communication system according to this embodiment, as shown in FIG. 2, Performance Specification B may specify the measurement cycle as "1600 ms" and the measurement accuracy of RSRP/RSRQ as "±3 dB (Es/Iot≥6 dB)".

In other words, as shown in FIG. 2, the mobile communication system according to this embodiment may be configured such that the measurement cycle specified by Performance Specification B is shorter than the measurement cycle specified by Performance Specification A.

Also, as shown in FIG. 2, the mobile communication system according to this embodiment may be configured such that the measurement accuracy specified by Performance Specification B is higher than the measurement accuracy specified by Performance Specification A.

Note that, in current LTE, "measCycleScell-r10" set in "MeasObjectEUTRA" in "Measurement Configuration" can be used to set a measurement cycle of "Deactivated Scell Measurement (Case 2)" in a cell which is set as an Scell but not activated.

Here, "Deactivated Scell Measurement" means "Intra-Frequency Measurement" in the Scell which is set but not activated.

In contrast to this, the mobile communication system according to this embodiment may be extended such that "measCycleScell-r10" described above can be used to set not only the measurement cycle of "Deactivated Scell Measurement (Case 2)" in a cell set as an Scell but not activated but also a measurement cycle of "Inter-Frequency Measurement (Case 1)" in a cell not set as an Scell.

The invention according to this embodiment can require appropriate performance of "Inter-Frequency Measurement" according to the conditions of a cell to be measured.

Modified Example 1

With reference to FIG. 3, a mobile communication system according to Modified Example 1 of the present invention is described. The mobile communication system according to Modified Example 1 is described below by focusing on differences from the mobile communication system according to the first embodiment described above.

As shown in FIG. 3, a mobile station UE performs "Measurement" in a cell #11 as well as "Measurement" in cells #11A and #11B disposed in a coverage area of the cell #11.

More specifically, the mobile station UE performs "Inter-Frequency Measurement" for the cell #11B which is not set as the Scell in the area from Point A to Point B within the cell #11 (Case 1).

Moreover, the mobile station UE performs "Deactivated Scell Measurement" for the cell #11B which is set as the Scell but not activated in the area from Point B to Point C within the cell #11 (Case 2).

Furthermore, the mobile station UE performs "Intra-Frequency Measurement" for the cell #11B activated as the Scell in the area from Point C to Point D within the cell #11 (Case 3).

For the above cases, the mobile communication system according to this embodiment is configured to separately specify the performance required for "Intra-Frequency Measurement (Case 3)" for the activated Scell (Performance Specification C), the performance required for "Deactivated Scell Measurement (Case 2)" for the Scell which is set but not activated (Performance Specification B), and the performance required for "Inter-Frequency Measurement (Case 1)" for the cell which is not set as the Scell (Performance Specification A).

For example, in the mobile communication system according to this embodiment, as shown in FIG. 3, Performance Specification A may specify the measurement cycle as "3200 ms" and the measurement accuracy of RSRP (Reference Signal Received Power)/RSRQ (Reference Signal Received Quality) as "±3 dB (Es/Iot≥0 dB)".

Also, in the mobile communication system according to this embodiment, as shown in FIG. 3, Performance Specification B may specify the measurement cycle as "1600 ms" and the measurement accuracy of RSRP/RSRQ as "±3 dB (Es/Iot≥6 dB)".

Moreover, in the mobile communication system according to this embodiment, as shown in FIG. 3, Performance Specification C may specify the measurement cycle as "200 ms" and the measurement accuracy of RSRP/RSRQ as "±3 dB (Es/Iot≥6 dB)".

As shown in FIG. 3, the mobile communication system according to this embodiment may be configured such that the measurement accuracy of RSRP/RSRQ specified by Performance Specification B becomes equal to the measurement accuracy of RSRP/RSRQ specified by Performance Specification C.

Moreover, as shown in FIG. 3, the mobile communication system according to this embodiment may be configured such that the measurement cycle specified by Performance Specification C is shorter than the measurement cycle specified by Performance Specification B.

Furthermore, as shown in FIG. 3, the mobile communication system according to this embodiment may be configured such that the measurement cycle specified by Performance Specification B is shorter than the measurement cycle specified by Performance Specification A.

Note that, in current LTE, "measCycleScell-r10" set within "MeasObjectEUTRA" in "Measurement Configuration" can be used to set a measurement cycle of "Deactivated Scell Measurement (Case 2)" in the cell which is set as the Scell but not activated.

In contrast, the mobile communication system according to this embodiment may be extended such that "measCycleScell-r10" described above can be used to set not only the measurement cycle of "Deactivated Scell Measurement (Case 2)" in the cell which is set as the Scell but not activated but also a measurement cycle of "Inter-Frequency Measurement (Case 1)" in the cell which is not set as the Scell.

The invention according to this embodiment can separately specify Performance Specifications A to C for Cases 1 to 3 shown in FIG. 2, and thus can require appropriate performance of "Measurement" according to the conditions of a cell to be measured.

The above-described features of the embodiment may also be expressed as follows.

A first feature of the embodiment is summarized as a mobile communication system configured to be able to perform CA (carrier aggregation) using a Pcell (primary cell) and a Scell (secondary cell) operated by different frequency carriers, in which the mobile communication system separately specifies performance required for "Inter-Frequency Measurement" used for "Inter-Frequency Hanover" control between macrocells #11 and #12 and performance required for "Inter-Frequency Handover" (measurement) of a cell #11B not set as the Scell within a coverage area of each of the macrocells #11.

A second feature of the embodiment is summarized as a mobile communication system configured to be able to perform CA using a Pcell and a Scell operated by different frequency carriers, in which the mobile communication system separately specifies first performance required for "Measurement" of an activated Scell, second performance required for "Measurement" of a Scell which is set but not activated, and third performance required for "Measurement" of a cell which is not set as the Scell, and each of the first performance, the second performance and the third performance includes measurement accuracy and a measurement cycle.

In the second feature of the embodiment, the mobile communication system specifies the performance such that the measurement accuracy included in the first performance is equal to the measurement accuracy included in the second performance.

It should be noted that the foregoing operations of the mobile station UE and the radio base station eNB may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE and the radio base station eNB. Otherwise, the storage medium and the processor may be provided as discrete components inside the mobile station UE and the radio base station eNB.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-017378 (filed on Jan. 30, 2012) is incorporated by reference in the present specification.

INDUSTRIAL APPLICABILITY

As described above, the present invention can provide a mobile communication system capable of requiring appropriate performance of "Inter-Frequency Measurement" according to the conditions of a cell to be subjected to "Inter-Frequency Measurement".

EXPLANATION OF THE REFERENCE NUMERALS

UE mobile station
eNB radio base station

The invention claimed is:

1. A mobile communication system configured for performing carrier aggregation using a primary cell and a secondary cell operated by different frequency carriers, wherein
the mobile communication system comprises:
a plurality of base stations, wherein each base station manages at least one cell;
at least one mobile terminal configured to perform carrier aggregation using the at least one cell managed by the plurality of base stations,
wherein the mobile communication system separately specifies first performance required for measurement of an activated secondary cell, second performance required for measurement of a secondary cell which is set but not activated, and third performance required for measurement of a cell which is not set as the secondary cell, and
each of the first performance, the second performance and the third performance includes measurement accuracy and a measurement cycle.

2. The mobile communication system according to claim 1, wherein
the mobile communication system specifies the performance such that the measurement accuracy included in the first performance is equal to the measurement accuracy included in the second performance.

* * * * *